INVENTOR.
RICHARD C. MOTT
BY
*Joseph E Ryan*
ATTORNEY

July 27, 1965  R. C. MOTT  3,197,140
UNIT VENTILATOR CONTROL APPARATUS
Filed April 20, 1962  2 Sheets-Sheet 2

INVENTOR.
RICHARD C. MOTT
BY Joseph E. Ryan
ATTORNEY

United States Patent Office 3,197,140
Patented July 27, 1965

3,197,140
UNIT VENTILATOR CONTROL APPARATUS
Richard C. Mott, Harwood Heights, Ill., assignor to Honeywell Inc., a corporation of Delaware
Filed Apr. 20, 1962, Ser. No. 189,155
6 Claims. (Cl. 236—1)

This invention relates to unit ventilator control apparatus and more particularly to an improved valving system particularly adaptable for unit ventilator controls.

The control of individual space heaters, air distribution units, or unit ventilators is well recognized and is diversified to meet varying requirements for air conditioning. This specific invention herein is directed to an improved valving system particularly applicable to unit ventilating control apparatus in which the unit ventilator will utilize constant circulation of the air for ventilation purposes across a heat exchanger in which a temperature changing medium flows. The particular invention permits the regulation of flow of the air conditioning medium through the heat exchanger in a constant volume or at a constant rate independent of pressure variations in the temperature changing fluid or medium. With the use of constant circulation across such heat exchanger, a fixed amount of heat for a given unit of time will be supplied to the space to be air conditioned as well as ventilated so that temperature therein may be accurately controlled.

Figure 1:
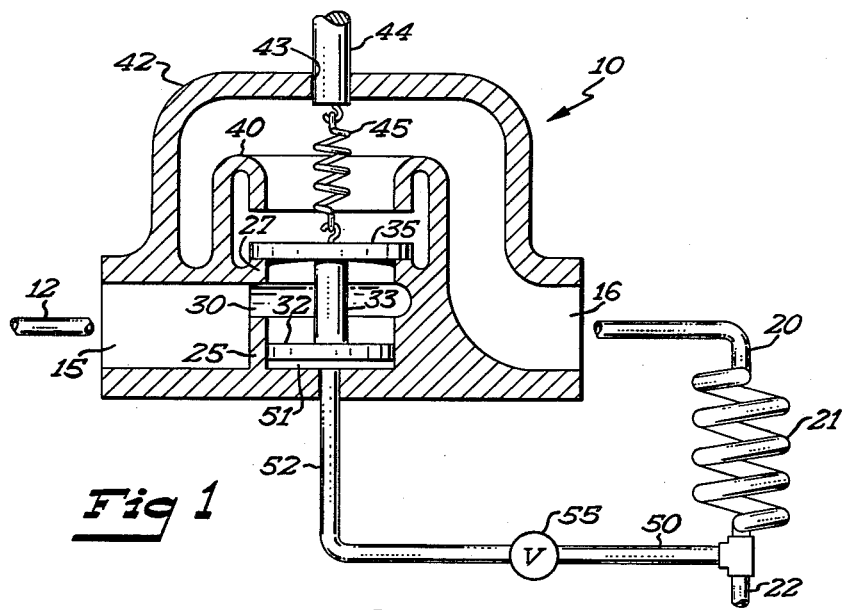
Figure 2:
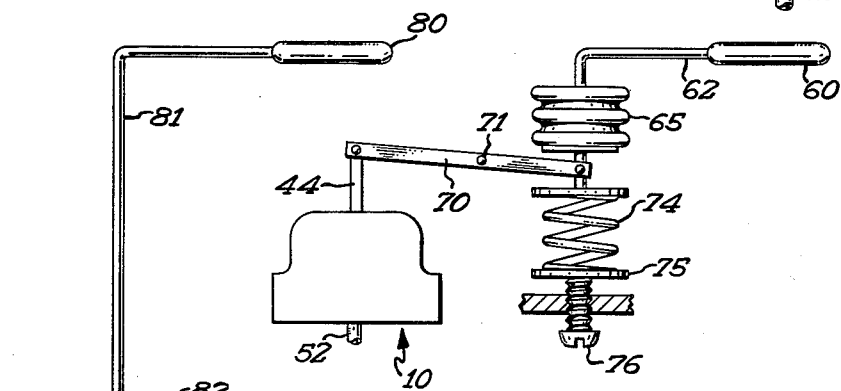
Figure 3:
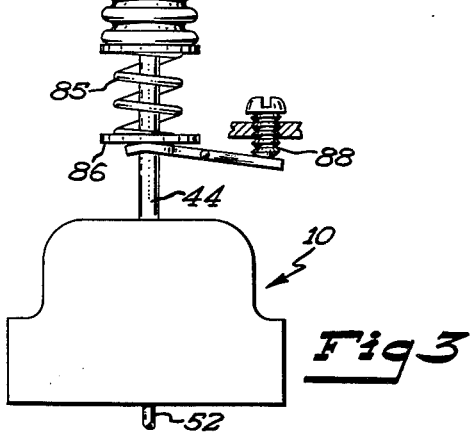
Figure 4:
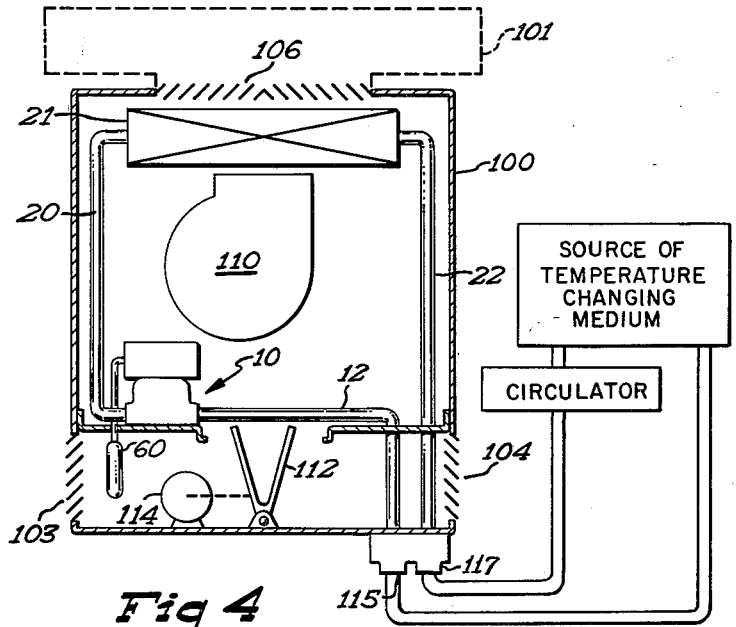
Figure 5:
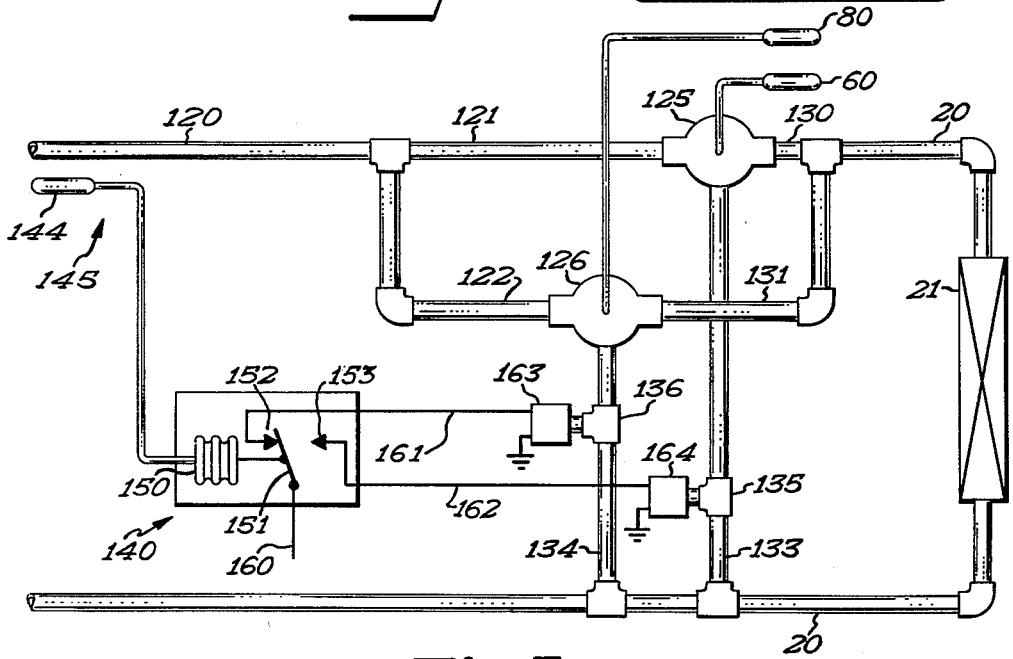

The particular invention herein is directed to a valving system which may be applied to various types of unit ventilating equipment in which the air circulator and the damper apparatus or circulating air valving system may be controlled from any one of a number of control variations. In this invention an improved control of flow of the temperature changing medium through the heat exchanger coil is provided with further provision for automatic changeover in valving between temperature changing mediums of two different temperature levels for summer-winter operation. Therefore, it is an object of this invention to provide an improved unit ventilating control apparatus. Another object of this invention is to provide in a unit ventilating control apparatus an improved valving system or pressure regulating valving to insure a fixed delivery of the temperature changing medium to the heat exchanging unit of the unit ventilator for a fixed demand on the system. Another object of this invention is to provide an improved unit ventilating control apparatus having a valving system adaptable for automatic summer-winter changeover. These and other objects of this invention will become apparent from a reading of the attached description, together with the drawings wherein:

FIGURE 1 is a schematic diagram of the improved unit ventilator valve showing its relationship to the unit ventilator coil, FIGURES 2 and 3 are schematic diagrams of the thermal system controlling the regulating valving designed for reverse and direct control action of the valving system respectively, FIGURE 4 is a schematic diagram of a unit ventilator in which the improved valving system may be utilized, and FIGURE 5 is a schematic diagram of a unit ventilating valving system particularly adapted for summer-winter switchover operation.

The pressure regulating valve or unit ventilator control valve 10 of FIGURE 1 is shown schematically as connected to an inlet pipe 12 adapted to be connected to a source of temperature changing medium such as a hot water circulating or cold water circulating system. The valve body or valve 10 includes an inlet conduit 15 and an outlet conduit 16, the outlet conduit being connected, as schematically shown in FIGURE 1, through a piping 20 to a heat exchanger coil 21 and from the heat exchanger coil 21 to a conduit 22 leading back to the source of temperature changing medium to complete a circulating system.

The regulating valve or unit ventilator valve 10 in FIGURE 1 shows the valve body schematically as a single unit. It will be understood, however, that it will require a multi-part construction to permit assembly of parts, to be hereinafter identified, therein. This valve body includes a central section or housing 25 which is basically cylindrical in form and terminates at its periphery in an annular valve seat 27. This housing has an aperture or apertures 30 therein which communicate with the inlet passage or port 15 of the valve and positioned within the housing is a pressure responsive means or piston 32 connected by means of a shaft 33 to a disc type or cylindrical valve closure member 35. The pressure responsive piston 32, together with the shaft 33 and disc 35, combine to form a plug type valve member with the upper portion of the plug cooperating with the valve seat to provide the valve closure portion. This cylindrical housing or pressure regulating housing actually is positioned intermediate the inlet and outlet ports 15 and 16 of the regulating valve and divides the valve body in this function. Positioned above the valve seat and integral with the valve housing is an annular stop structure indicated generally at 40 which defines a limit of upper movement for the valve closure member 35 for purposes to be later noted. The remaining portion of the valve body includes a dome or bonnet section 42 having an aperture therein indicated generally at 43 in which is positioned a slidable member 44 connected to a spring 45 which is connected in turn at its opposite extremity to the valve closure member 35. Spring 45 cooperates with the disc type valve closure member 35 to form a pressure regulator, as will be later noted. The inlet pressure from the inlet port 15 through the aperture 30 in the housing is applied to the exposed surface of the piston 32 or pressure responsive means and the undersurface of the valve closure member 35 which elements both present the same cross-sectional area to the inlet pressure and thereby balance out the effect of the inlet pressure on the valve closure member 35. The outlet pressure exposed to the upper surface of the valve closure member will apply a downward force or closure force to the valve closure member urging the same toward the valve seat 27. This force will be in opposition to the force applied by the regulating spring 45 and the two will balance to provide for a given valve opening and flow through the valve in the conventional regulating manner. The bias of the spring may be changed by moving the adjusting member 44 in the valve casing 10 which adjusting member is movable but sealed in the aperture 43 through means not shown.

The outlet flow to the heat exchanger coil 21 through the conduit 20 will provide a delivery of a given amount of temperature changing medium, for example hot water, to the coil 21 across which air is circulated for the purpose of tempering the same. This flow will be constant since a control line is connected to the downstream side of the coil, such as is indicated at 50 and 52 back to the undersurface of the pressure responsive means 32 or within the housing 25 of the valve body to the space, indicated at 51, wherein the downstream pressure is applied to the undersurface of the piston or pressure responsive means to act against the upstream pressure on the upper surface of the valve closure member 35. This will provide a differential across the valve spool or plug which will indicate the pressure drop through the heat exchanger coil. This pressure differential acting against the spring 45 will permit regulation of the unit ventilator valve or pressure regulating valve to provide a given opening and a given flow therethrough which is constant for given spring settings and with given inlet pressures applied to the valve. The openings will vary with inlet pressure to maintain a constant volume flow through the pressure regulator and into the heat exchanger coil 21 to provide a constant amount of temperature changing medium flowing through the coil and hence a constant amount of heat applied to the space to be air conditioned by the unit ventilator apparatus.

As shown in FIGURE 1, the return conduit or control conduit may or may not include a valve, such as indicated at 55, the valve being included herein as an indication of how the pressure regulator may be shut down and how such an auxiliary control valve may be used in a summer-winter changeover system. By closing the valve 55 and the conduit 52 from the chamber 51, the pressure regulating valve may be driven to a closed position defined by the stop 40 which also forms an auxiliary valve seat defining an upper limit of travel in the valve closure member and sealing the passage between the inlet and outlet ports 15, 16. This valving operation or shutdown operation is possible because of the inherent leakage around the piston 32 from the inlet passage 30 which leakage will provide a pressure within the chamber 51 which will gradually build up to the inlet pressure, canceling out the effect of the pressure responsive means 32 on the valve closure member and applying the additional force on the undersurface of the valve closure member which, together with the force of the spring, will tend to move the valve closure member against the upper stop or valve seat 40 wherein the valve closure member will seal the passage to the outlet conduit 15 through the pressure regulating valve. By opening the valve 55, the chamber 51 is communicated with the outlet or return line 22 of the heat exchanger coil which pressure would be substantially lower than the pressure at the inlet side of the valve and hence any leakage beyond the piston 32 would be communicating with the outlet side or return side of the heat exchanger coil so that the pressure in the chamber 51 would be controlled by and be an indication of the pressure at the outlet or downstream side of the heat exchanger coil to perform the regulating function described above.

The control of the setting of the regulator, that is the adjustment of the bias of the spring 45 in the regulator is effected from a thermal system or thermostat. Thus, in FIGURES 2 and 3 there is shown examples of a vapor or liquid filled system which operates through motion transducers to move adjusting member 44 connected to the bias or regulating spring 45 of the regulator as shown in FIGURE 1. In FIGURE 2, for example, a reverse acting system is shown, while FIGURE 3 shows a direct acting type adjusting system. That is, the system in FIGURE 2 will open the associated regulating valve and that of FIGURE 3 will close the associated regulating valve respectively upon a rise in ambient temperature to which the system responds. The main sensing element in FIGURE 2 is a bulb 60 which may be placed in the recirculated air path of the unit ventilator, in the space to be air conditioned, or in the air discharge path of the unit ventilator to respond to discharge air temperature from the heat exchanger. This bulb is connected through a capillary 62 to an expansion member or bellows 65 which is in turn connected to a lever 70 which is pivoted as at 71, and connected to the operating shaft 44 of the regulating valve shown schematically at 10. The lever 70 also has connected thereto an additional adjusting or bias spring 74 which spring is connected through a plate to the lever at one extremity and through a second plate 75 having an adjusting screw 76 associated therewith for set point adjustment. Expansion of the liquid in the closed thermal system 60 upon a rise in ambient temperature surrounding the same will expand the expansion member or bellows 65 to pivot the levers 70 in such a manner that the tension on the spring 45 connected to the adjusting member 44 is increased, thereby permitting a larger flow through the valve or resetting the valve in accordance with a temperature increase. This reverse acting system is used in connection with cooling applications wherein the regulator is reseat to a higher volume of flow in accordance with rising temperature. The thermal system shown in FIGURE 3 is sbstantially the same except that it is designed to be of the direct acting type. Thus, the bulb 80 is connected through a capillary or tube 81 to an expansion member 82 which in turn is connected through the linkage 44 to the adjusting spring 45 of the regulating valve. The bellows in this embodiment is biased by means of a spring 85 having an adjusting plate 86 resting against the same, which plate is adjusted by means of a screw 88 acting against a base to vary the spring bias and hence the spring rate on the bellows in a direction opposite to the expansion of the bellows 82. Since the linkage from the operating bellows is direct to the regulating valve, expansion of the fluid in the bulb upon a rise in ambient temperature surrounding the bulb will expand bellows 82 to reset the spring 45 to decrease the tension thereof on the regulating valve 10 and hence decrease the flow therethrough. This type of thermal system is used whenever an expansion or rise in ambient temperature surrounding a bulb will effect a closure of the regulating valve through reset of the bias spring in the direction to decrease the outlet pressure from the valve. Thus, this version of the thermal system would be used in heating applications where the medium being valved would be hot water or the equivalent for air conditioning or heating purposes. The valve then would open on a fall in ambient temperature and close on a rise in temperature of the ambient surrounding the bulb 80. It will be understood in this embodiment that the bulbs or thermal systems herein can respond correctly to space temperature by being positioned in the space or to recirculated air temperature indicative of the temperature of the space or may be used to sense ambient temperature of the air being discharged from the ventilator.

FIGURE 4 shows a schematic disclosure of a unit ventilator cabinet or air distribution unit indicated generally at 100. This unit is adapted to be positioned in or adjacent to a space to be air conditioned indicated generally at 101. The cabinet includes an inlet air passage 103 for recirculated air and outside air passage 104 for fresh air coming from outside of the building or the space to be air conditioned and a discharge passage or outlet 106 through which air is discharged after being tempered. The unit ventilator includes in addition an air circulator 110, a heat exchange coil previously indicated schematically at 21 in FIGURE 2. In addition, the cabinet mounts the unit ventilator regulating valve indicated generally at 10 and described in connection with FIGURES 1 through 3. The control of the air through the interior of the ventilator casing 100 from the inlets 103, 104 is controlled by a suitable means such as a damper indicated at 112 which is positioned by a motor 114. While a splitter type damper and a separate motor means are shown schematically here, it will be recognized that self-contained valving, pneumatic or electric valving, and other various types of valve configurations may be utilized to effect this valving operation. For the purposes of the present disclosure, it will be recognized that any type of air valving may be utilized for proportioning the recirculated air to fresh air being drawn into the unit ventilator and this valving may be operated in conjunction with or apart from the thermal systems operating the regulating valve 10. Similarly the circulator which may or may not be of the continuously operating type will be controlled manually or automatically through a thermal switch, also not shown, and the details of which form no part of the present invention.

The present valving system, however, is directed basically to the control of the temperature changing medium through the heat exchanger coil of the unit ventilator and the regulation of the same to compensate for the drop in the unit ventilator coil. Thus, as seen in FIGURE 4, the coil 21 is connected through the piping 20 to the valve 10 through the inlet conduit 12 to a manifold or pipe connection indicated generally at 115. It will be understood that the circulating system input will be connected to the unit ventilator at this point. Similarly, the return conduit 22 from the coil 10 is connected to the manifold or outlet conduit 117 of the unit ventilator to return to the source completing the closed system for the temperature changing medium. It will be further understood that the circulation means for this system, whether a self-contained or separate pressure supplying means, will be provided for circulating the flow of the air conditioning medium through the system.

With this arrangement for improved valving, the position of the regulating spring as controlled by the thermal system will set the spring force on the regulator for adjustment purposes. Thus, as in FIGURE 4, the expansion bulb 60 or 80 may be located in the space to be air conditioned, on the unit ventilator in the return or circulated air line as an indication of space temperature, or in the discharge line of the unit ventilator to measure discharged air therefrom. The spring force on the regulating valve, as shown in FIGURE 1, will control the difference in pressure between the outlet from the regulating valve and the reference pressure supplied through the conduits 50, 52 to the pressure responsive means. Thus, it will regulate the pressure drop across the heat exchanger coil to maintain a constant flow of air conditioning or temperature changing medium therethrough. In this regulating valve the main line pressure is balanced out, and the pressure drop across the coil tends to remain constant as main line pressure changes. Further, the force required to operate the pressure regulating valve is substantially reduced as the inlet pressures on the valve are cancelled out.

This improved valving apparatus is shown in connection with a summer-winter changeover system for automatic control in FIGURE 5. In FIGURE 5, an inlet conduit 120 from the supply source is directed through a parallel conduit arrangement 121, 122 and to separate regulating valves 125, 126. These valves will be the same as that shown in FIGURE 1 with a control system such as shown in FIGURES 2 and 3, as will be later noted. Outlet conduits 130, 131 of these regulating valves are connected to the common conduit 20 leading to the heat exchanger coil 21 and from the coil 21 through a return pipe 22 leading back to the source of the temperature changing medium. Each of the valves has, in addition, control lines from the downstream side of the valve, such as is shown at 133, 134 which control lines are the same as 50, 52 shown in FIGURE 1. In addition, these control lines include control valves 135, 136, which valves are operated through a differential pressure operated switch 140. This switch in turn is controlled by a thermal system indicated generally at 145 and including a bulb 144 responding to inlet water temperature at the supply conduit 120 or the temperature of the temperature changing medium therein.

The regulating valves 125, 126 in this summer-winter changeover system each have associated therewith different thermal systems for reversing the operation of the valves. Thus, one system has a reverse acting valve arrangement and one a direct acting valve arrangement with changes in ambient temperature surrounding the respective bulb 60 or 80 associated therewith. This will increase or decrease the flow through the valves with a rise or a fall in ambient temperature in a conventional manner to adjust the same for control of a heating or cooling medium to the coil 21 of the unit ventilator. As indicated in FIGURES 2 and 3, the reverse acting system is controlled by the thermal bulb 60 and will be applied to the cooling system so that upon a rise in temperature the associated regulating valve will open, allowing more of the cooling medium to flow to the coil. Similarly, in the thermal system of FIGURE 3 which is direct acting, a rise in ambient temperature will decrease the flow through the coil and be applicable to a heating medium. In each embodiment, separate set point adjusting mechanisms are included to adjust the spring rate for the bellows of the closed thermal system. While closed thermal systems are shown herein, it will be recognized that other types of mechanical adjusting means for adjusting the regulator may be provided, if desired. The respective regulating valves 125, 126 will not be connected in the heat exchanger coil 21 at the same time so that depending upon the temperature of the temperature changing medium flowing in the supply conduit 120 to the heat exchanger coil, one or the other of the valves will be operative. This is accomplished by operating the control valve in the return line from the heat exchanger coil to the pressure regulating section of the valve to be closed so that it will have its control line closed, allowing pressure to build up in the pressure regulator of this valve to overcome the force of the outlet pressure and aid the respective springs of the regulator to a point where the valve will reach the stop seat 40, as indicated in FIGURE 1, to close the valve and render the line therethrough inoperative. As will be seen in FIGURE 5, the respective solenoid type valves, shown schematically in FIGURE 5 at 135, 136, are located in the control lines 133, 134 leading to the valves 125, 126 and these will be selectively and differentially energized for this purpose. Thus, the pressure responsive switch 140 is operated by the thermal system 145 with its bulb 144 positioned adjacent the inlet line to the unit ventilator. Depending upon the temperature of the temperature changing medium therein, the pressure responsive means or expansion element 150 of the pressure responsive switch 140 will respond or be moved in such a direction and to such an extent that the switch mechanism formed by the movable contact 151 and the stationary contacts 152, 153 thereof will be selectively operated. That is, the wiper 151 will engage one or the other of switch contacts 152, 153 to set up an electrical circuit through the wiper from a supply conductor indicated at 160 through the respective contacts to conductors 161, 162 leading to coil portions 163, 164 of the valves 135, 136. It will be understood that the switching mechanism will be open circuited for one coil and a closed circuit condition for the other coil so that one will be energized while the other is de-energized. It will be assumed that the operation of the de-energized coil will be closed and that the thermal system 145 will respond in such a manner that the switching mechanism 151–153 will be positioned so as to be in contact with one or the other of the stationary contacts 152, 153 so that one or the other of the solenoids 163, 164 will be energized and one or the other of the valves 135, 136 will be closed. This will permit the opposite valve to be directly connected from the return side or downstream side of the heat exchanger coil 21 to the pressure regulating side of the respective valve 125 or 126 for control purposes. Thus, for example, assume that the inlet water temperature is cold for a desired cooling operation for the unit ventilator. The temperature responsive system operates the pressure responsive switch 140 to close contact 153 such that the solenoid 164 of valve 135 will be energized and open while the opposite valve 136 will be closed and out of the circuit or locked out from an operational standpoint. The thermal system 60 associated with the valve 125 which has the control valve 135 in its return line will be operative and a reverse acting type of regulating valve operation will be connected for control of the system. Thus, whenever a rise in temperature is experienced in the space to be air conditioned, the thermal system 60 will respond in the manner as shown in FIGURE 2 to adjust the pressure regulating valve toward an open direction, permitting more of the temperature changing or cooling medium to be sent to the coil 21 for cooling purposes.

On the heating operation, the water temperature in the inlet line 120 will have reversed the operation of the temerature responsive or thermal system 145 so that the pressure responsive switch 140 will have operated in the opposite direction, closing the valve 135 to lock out the pressure regulating valve 125 and opening the valve 126 in the system so that the direct acting control operation thereof will permit use of the heating medium to the heat exchanger coil. With this arrangement, the flow through the coil is regulated so that a constant amount of heat can be obtained from the heat exchanger coil for a given circulation, assuming constant circulator operation. variation in inlet water pressure is compensated for by the pressure regulating valve which permits the adjustment of the regulator to regulate the flow through the regulating valve. Similarly, the regulating valve is reset by the temperature demands of the space or the temperature of the discharge air to reset flow rate through the regulator. This dual valve system with separate control responding to the water temperature being supplied to the heat exchanger may be utilized for summer-winter changeover as outlined above. It will be recognized in this embodiment that the operation of the circulator and the damper on air valving operation from the circulated inlet or fresh air inlet to the unit ventilator may be controlled by any number of control forms and be compatible with the control apparatus disclosed herein. Thus, the thermal system, in addition to operating and resetting the regulating valves, could control the damper motors and the circulator if desired or a seperate control element responding to space temperature may be utilized for this purpose.

In considering this invention, it should be remembered that the present disclosure is intended to be illustrative only and the scope of the invention should be determined only by the scope of the appended claims.

I claim as my invention:

1. A unit ventilator control appartus comprising, a heat exchanger coil, conduit means connected to said heat exchanger coil to permit flow of a temperature changing medium therethrough and adapted to be connected to a source of temperature changing medium with means for circulating said medium such that said medium will continuously pass through said conduit from said source and return to said source, valve means included in said conduit upstream of said heat exchanger coil and adapted to control the flow of the heat exchanging medium through said heat exchanger coil, said valve means including pressure regulating means in the form of a spool type valve plug and a valve seat with an inlet passage to said valve means intermediate the extremities of said valve plug wherein one extremity cooperates with said valve seat to perform a valving function, spring means including an adjustment member connected between said valve plug and said movable adjustment member which extends into said valve means, said spring means and said spool type valve plug with the inlet to the valve means intermediate the extremities of said plug providing a pressure regulator in which inlet pressure is balanced out against said valve plug and the valve means is controlled by downstream pressure balanced against the spring means in said valve means, an additional control conduit connected to the downstream end of said heat exchanger coil and to the pressure regulating means of said valve means to provide a reference pressure acting on said valve plug in opposition to the downstream pressure thereon, and a thermal system including second pressure responsive means connected to and adjusting the bias on said spring means, said thermal system responding to temperature of the space to be controlled by said unit ventilator and operative to adjust said spring means to vary the flow through said valve means in accordance with temperature requirements of said space.

2. A unit ventilator control apparatus comprising, a heat exchanger coil, conduit means connected to said heat exchanger coil to permit flow of a temperature changing medium therethrough and adapted to be connected to a source of temperature changing medium with means for circulating said medium such that said medium will continuously pass through said conduit from said source and return to said source, valve means included in said conduit upstream of said heat exchanger coil and adapted to control the flow of the heat exchanging medium through said heat exchanger coil, said valve means including pressure regulating means having a spool type valve plug with an inlet passage to said valve means intermediate the extremities of said valve plug to balance out the effect of inlet pressure on said valve plug, a movable adjustment member extending through said valve means, spring means connected between said valve plug and said movable adjustment member extending into said valve means, said spring means and said spool type valve plug providing a pressure regulator in which the valve operation is controlled by downstream pressure balanced against the spring means in said valve means, control conduit means connected to the downstream end of said heat exchanger coil and to the pressure regulating means to provide a reference pressure acting on said valve plug in opposition to the downstream pressure thereon, and a thermal system including second pressure responsive means connected to and adjusting the bias on said spring means, said thermal system responding to temperature of the space to be controlled by said unit ventilator and operative to adjust said spring means to vary the flow through said valve means in accordance with temperature requirements of said space.

3. A unit ventilator control apparatus comprising, a heat exchanger coil, conduit means connected to said heat exchanger coil to permit flow of a temperature changing medium therethrough and adapted to be connected to a source of temperature changing medium with means for circulating said medium such that said medium will continuously pass through said conduit from said source and return to said source, valve means included in said conduit upstream of said heat exchanger coil and adapted to control the flow of the heat exchanging medium through said heat exchanger coil, said valve means including pressure regulating means having a pressure responsive and a valve closure section exposed to inlet pressure to said valve means, a movable adjustment means extending through said valve means, spring means connected between said pressure regulating means and said movable adjustment member which extends into said valve means, said spring means and said valve closure section providing a pressure regulator function in which inlet pressure is balanced out against said pressure responsive and said valve closure sections and the operation of the valve means is controlled by downstream pressure balanced against the spring means in said valve means, control conduit means connected to the downstream end of said heat exchanger coil and to the pressure regulating means to provide a reference pressure in oppositon to the downstream pressure thereon such that said regulating means controls said valve means to compensate for the drop in pressure in the heat exchanging medium across said heat exchanger coil, and means responding to temperature of the space to be controlled by said unit ventilator and operative to adjust said spring means of said regulating means to vary the flow through said valve means in accordance with temperature requirements of said space.

4. A unit ventilator control apparatus comprising, a heat exchanger coil, conduit means connected to said heat exchanger coil to permit flow of a temperature changing medium therethrough and adapted to be connected to a source of temperature changing medium with means for circulating said medium continuously from said source through said coil and returning to said source, a pair of valve means included in said conduit means in parallel relationship and being positioned upstream of said heat exchanger coil, each of said valve means being adapted to control the flow of heat exchanging medium through said heat exchanger coil, each of said valve means including pressure regulating means having a pressure responsive and a valve closure section exposed to an inlet pressure to said valve means, a movable adjustment member extending through said valve means, spring means connected between said pressure regulating means and said movable adjustment member extending into said valve means, said spring means and said valve closure section providing a pressure regulator function in which inlet pressure is balanced out against said pressure responsive and said valve closure sections and the valve means is controlled by downstream pressure balanced against the spring means in said valve means, control conduit means for each of said valve means connected to the downstream end of said heat exchanger coil and to the pressure responsive section of said respective pressure regulating means of each of said valve means to provide a reference pressure in opposition to the downstream pressure thereon such that said regulating means controls said valve means to compensate for the drop in pressure in the heat exchanging medium across said heat exchanger coil, a thermal sensitive means for each of said valve means connecting to the respective valve means and adapted to adjust the bias of said spring means thereon to control the operation of said pressure regulator in accordance with temperature of said space, said thermal systems being respectively reverse and direct acting and operative to adjust the bias of said spring means of said pressure regulating means of each of the valve means in opposite directions with a similar change in temperature, additional valve means positioned in each of said control conduit means, leading from the extremity of said heat exchanger coil to the respective pressure regulating means of the respective valve means, thermal sensitive means connected to the upstream side of said conduit means adapted to carry said heat exchanging medium through said valve means and to said coil to respond to the temperature of said temperature changing medium, and control means connected to said thermal means and responsive to the operation thereof to respectively control the additional valve means in said conduit means such that one of said additional valve means is open while the other of said additional valve means is closed.

5. A unit ventilator, including, a valve having a valve body including inlet and outlet ports, pressure regulating means for said valve positioned within said body intermediate said inlet and outlet ports, a valve seat and valve closure member positioned adjacent said regulating means, means included in said regulating means for balancing out the effect of pressure at the inlet port of said body on the inlet side of said valve closure member, the valve closure member further being exposed on the downstream side to the outlet port of said valve body and attached to said valve closure member, means connecting said valve to a unit ventilator having a heat exchanger coil to control flow through said coil, means for varying the effect of the pressures and spring forces on said valve closure member included in said regulating means, and conduit means connecting an outlet end of said coil to said regulating means to cause said last named means to compensate said regulating means for the pressure drop across said heat exchanger coil.

6. A unit ventilator, comprising, a valve having a valve body including inlet and outlet ports therein, regulating means positioned within said body being located between said inlet and outlet ports of said body, a valve seat positioned in said body adjacent said regulating means, piston means included in said regulating means, said regulating means further including a disc-like valve closure member cooperating with said valve seat, a shaft connecting said piston and said valve closure member in a spaced relationship, the piston of said regulating means and said valve closure member on said valve seat being so positioned as to be simultaneously exposed to the medium being valved at said inlet port of said body such that the forces created by the pressure at said inlet port cancel out on said valve closure member and said piston, the downstream side of said valve closure member being responsive to downstream pressure and said downstream pressure applying a force to said valve closure member in a closing direction, spring biasing means connected to said valve closure member and said body and applying a force to said valve closure member in an opening direction, means connecting said valve to a heat exchanger coil of a unit ventilator to control flow through said coil, and conduit means connected to the downstream side of said coil and to said regulating means in such a manner to respond to the pressure drop in said coil, the connection of said conduit means to said regulating means effecting a reset of said regulating means.

References Cited by the Examiner

UNITED STATES PATENTS

| | | | |
|---|---|---|---|
| 2,256,566 | 9/41 | McElgin | 236—38 |
| 2,344,555 | 3/44 | McGrath | 165—28 |
| 2,587,815 | 3/52 | Branson | 236—99 |
| 2,727,691 | 12/55 | Alyea et al. | 236—38 |
| 2,881,793 | 4/59 | Lee | 137—501 |
| 3,028,876 | 4/62 | Gratzmuller | 137—501 |

FOREIGN PATENTS 848,460   9/60   Great Britain.

EDWARD J. MICHAEL, *Primary Examiner.*

PERCY L. PATRICK, *Examiner.*